(12) United States Patent
Fume et al.

(10) Patent No.: US 10,417,267 B2
(45) Date of Patent: Sep. 17, 2019

(54) INFORMATION PROCESSING TERMINAL AND METHOD, AND INFORMATION MANAGEMENT APPARATUS AND METHOD

(71) Applicant: KABUSHIKI KAISHA TOSHIBA, Minato-ku, Tokyo (JP)

(72) Inventors: Kosei Fume, Kanagawa (JP); Masaru Suzuki, Kanagawa (JP); Masahiro Morita, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 704 days.

(21) Appl. No.: 14/483,290

(22) Filed: Sep. 11, 2014

(65) Prior Publication Data
US 2015/0006573 A1 Jan. 1, 2015

Related U.S. Application Data

(63) Continuation of application No. PCT/JP2013/057572, filed on Mar. 12, 2013.

(30) Foreign Application Priority Data

Mar. 27, 2012 (JP) .................. 2012-072517

(51) Int. Cl.
*G06F 16/33* (2019.01)
*G06F 17/24* (2006.01)

(52) U.S. Cl.
CPC ........ *G06F 16/3344* (2019.01); *G06F 16/334* (2019.01); *G06F 17/241* (2013.01)

(58) Field of Classification Search
None
See application file for complete search history.

(56) References Cited

U.S. PATENT DOCUMENTS 7,814,085 B1 * 10/2010 Pfleger .............. G06F 17/30864
   707/708
8,434,001 B2 * 4/2013 Kandekar ......... G06F 17/30719
   707/602

(Continued)

FOREIGN PATENT DOCUMENTS

| CN | 101571859 A | 11/2009 |
| EP | 1 962 202 A2 | 8/2008 |
| JP | 2009-70278 A | 4/2009 |

OTHER PUBLICATIONS

International Preliminary Report on Patentability dated Oct. 9, 2014 from PCT/EJP2013/057572, 8 pages.

(Continued)

*Primary Examiner* — Ashish Thomas
*Assistant Examiner* — Katriel Y Chiu
(74) *Attorney, Agent, or Firm* — Ohlandt, Greeley, Ruggiero & Perle, L.L.P.

(57) ABSTRACT

According to one embodiment, an information processing terminal includes a generator, an acquisition unit, and an output unit. The generator analyzes an electronic document to generate a metadata item including text information in an electronic document and structure information on the electronic document. The acquisition unit transmits the metadata item to an information management apparatus, causes the information management apparatus to estimate a similar metadata item similar to the metadata item and acquires an annotation information item corresponding to the similar metadata item. The output unit outputs the annotation information item in association with the electronic document.

14 Claims, 12 Drawing Sheets

(56) References Cited

U.S. PATENT DOCUMENTS

| | | | |
|---|---|---|---|
| 9,262,390 B2* | 2/2016 | Edala | G06F 17/241 |
| 2002/0129057 A1* | 9/2002 | Spielberg | G06F 3/165 |
| | | | 715/201 |
| 2005/0060741 A1 | 3/2005 | Tsutsui et al. | |
| 2008/0005064 A1* | 1/2008 | Sarukkai | G06F 17/241 |
| 2008/0201632 A1 | 8/2008 | Hong et al. | |
| 2009/0254529 A1* | 10/2009 | Goldentouch | G06F 17/241 |
| 2009/0271353 A1 | 10/2009 | Fei et al. | |
| 2010/0278453 A1 | 11/2010 | King | |
| 2011/0276396 A1* | 11/2011 | Rathod | G06F 17/30867 |
| | | | 705/14.49 |
| 2012/0159391 A1* | 6/2012 | Berry | A61B 5/4824 |
| | | | 715/823 |
| 2012/0239390 A1 | 9/2012 | Fume et al. | |
| 2013/0024440 A1* | 1/2013 | Dimassimo | G06F 17/30864 |
| | | | 707/709 |

OTHER PUBLICATIONS

International Search Report dated Aug. 28, 2013 from PCT/EJP2013/057572, 4 pages.
Written Opinion dated Aug. 28, 2013 from PCT/EJP2013/057572, 6 pages.
Chinese First Office Action dated Nov. 1, 2016 from corresponding Chinese Patent Application No. 201380005184.4, 11 pages.

* cited by examiner

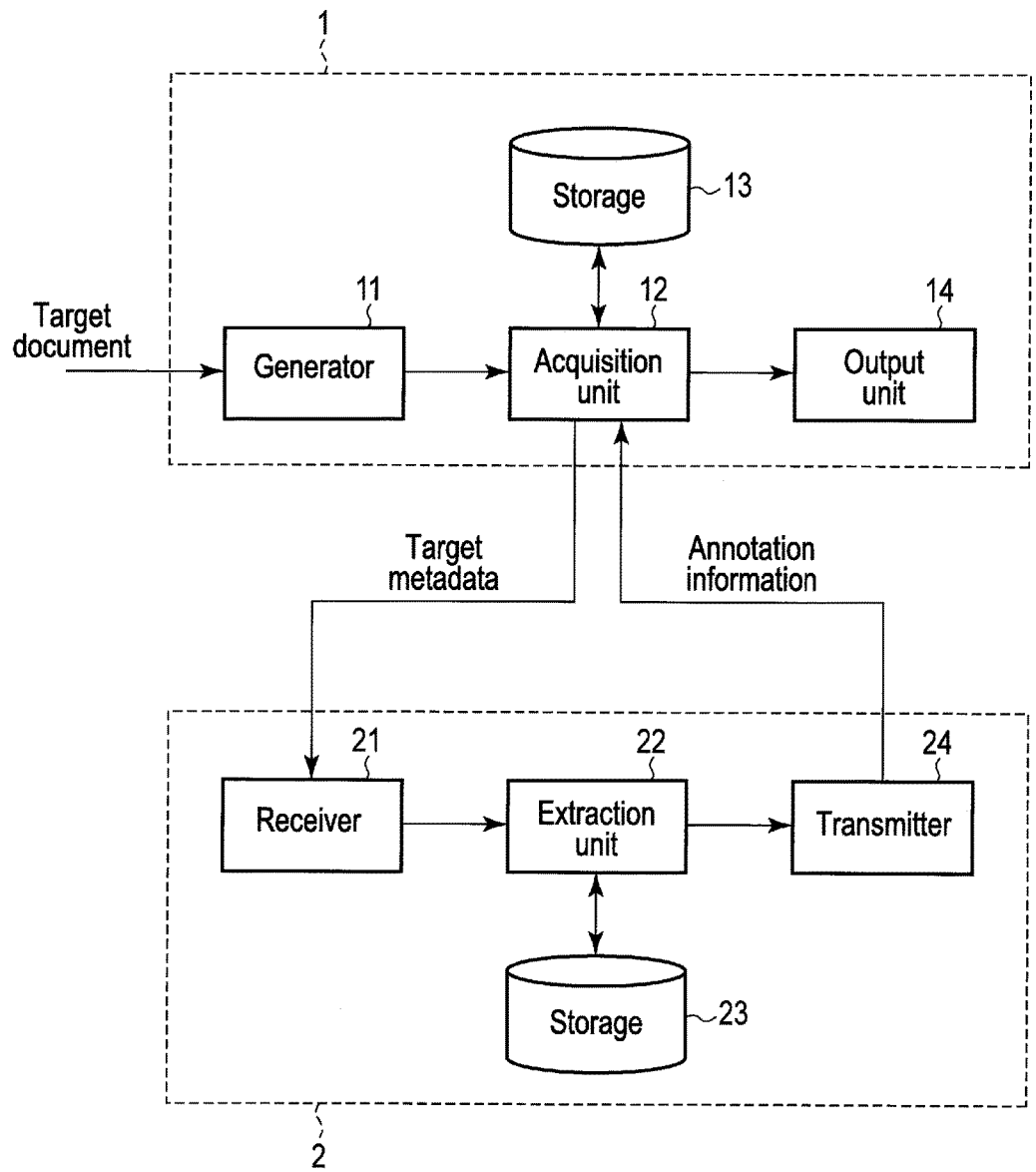
F I G. 1

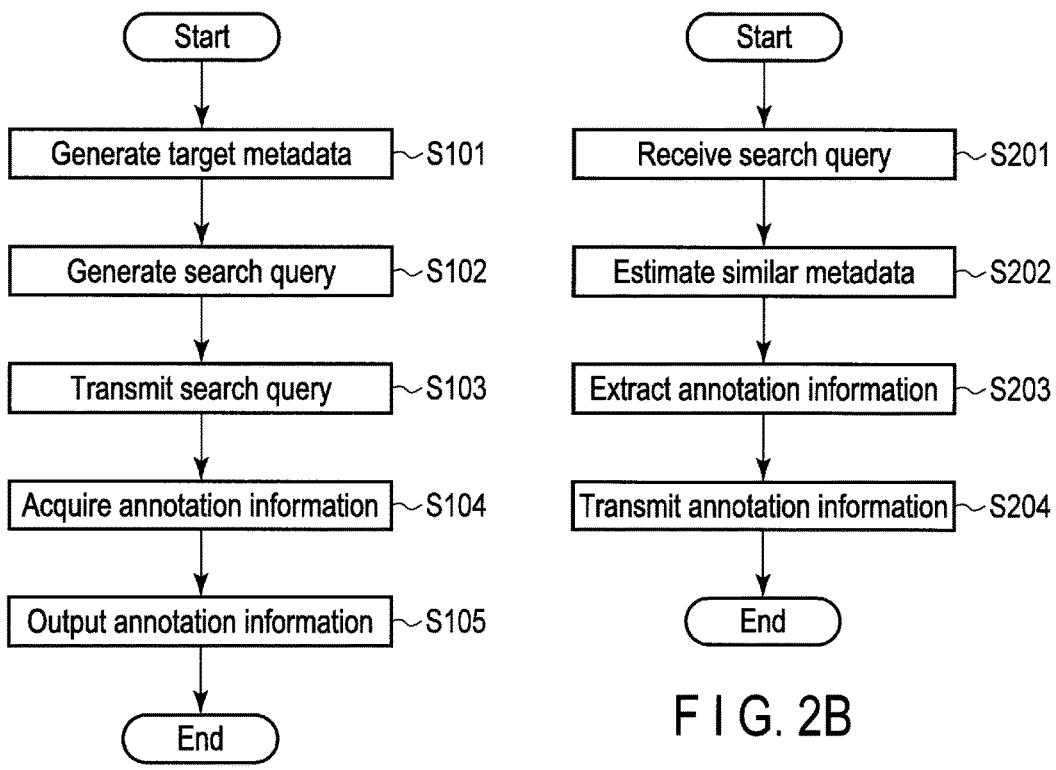
F I G. 2A
F I G. 2B
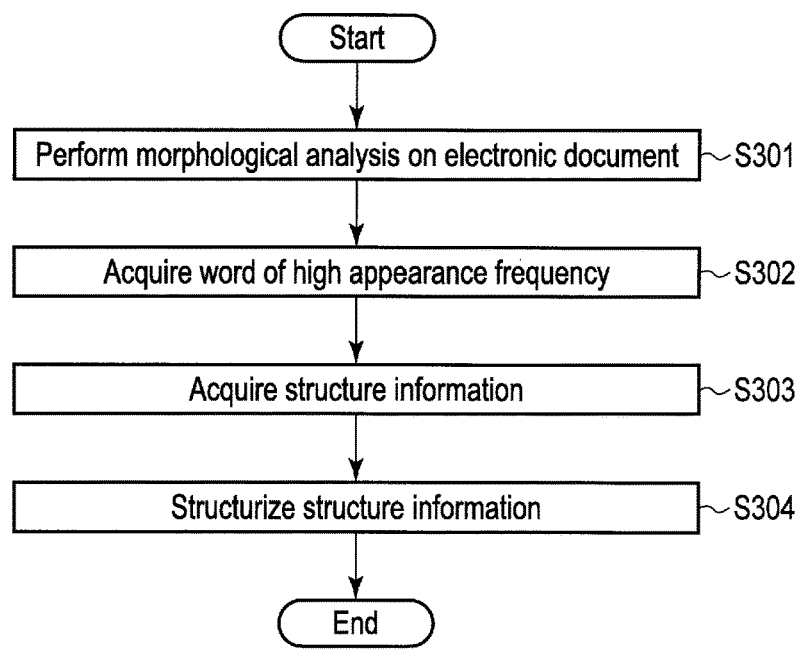
F I G. 3

Electronic document

Ivan the Fool

SKAZKA O IVANE-DURAKE

Tolstoi
Translated by xxx
―
In a certain kingdom there lived a rich peasant, who had three sons—Simeon (a soldier), TarrasBriukhan (a fat man), and Ivan (a fool)-- and one daughter, Milania, born dumb.

...

Body text

| | Indent number | Number of characters | Number of symbols | Number of numerals | Number of text sets | Number of character types | Font size | Logical element | Layout information |
|---|---|---|---|---|---|---|---|---|---|
| First line → | 4 | 11 | 0 | 0 | 3 | 1 | 20 | Title | 0111100000000000000 |
| Second line → | 20 | 19 | 1 | 0 | 3 | 1 | 18 | Body text | 0000000000001111111 |
| Third line → | 0 | 7 | 0 | 0 | 1 | 1 | 14 | Body text | 1100000000000000000 |

F I G. 4

```
<metadata id="123">
<description id="456" about="c:¥media¥book.pdf"
URL="http://www.toshiba.co.jp/ebook/#1298129sw/">
   <creator>Tolstoi</creator>
   <title>Ivan the Fool</title>
   <translator>xxx</translator>
   <resource\create-date>2001-09-04</resource\create-date>
</description>
<layout-pattern>
4,11,0,0,3,1,+2,Title,0111100000000000000
20,19,1,0,3,2,+1,Body text,00000000000001111111
0,7,0,0,1,1,0,Body text,1100000000000000000
. . . .
</layout-pattern>
<doctree-info>
   <refid="654"/>
</doctree-info>
<text-info>
   <hashed-pattern>5,5,7,12,13,22,4,5,9</hashed-pattern>
   <word freq="35">Old devil</word>
   <word freq="20">Straw</word>
   <word freq="10">Table</word>
   <word freq="5">Ivan</word>
</text-info>
</metadata>
```

F I G. 5

| Metadata ID | Electronic document ID | Electronic document URL | Metadata (URL) |
|---|---|---|---|
| 123 | 456 | C:¥media¥book.pdf | <metadata>(Content of metadata, or link to metadata)</metadata> |
| 124 | 457 | http://toshiba.co.jp/book/ID55323 | <metadata>(Content of metadata, or link to metadata)</metadata> |
| ...... | ...... | ...... | ...... |

Ivan the Fool

SKAZKA O IVANE-DURAKE

Tolstoi
Translated by xxx

---

In a certain kingdom there lived a rich peasant, who had |three sons--Simeon (a soldier), TarrasBriukhan (a fat man), and Ivan (a fool)--| and one daughter, Milania, born dumb.

↑ Text data selected by user

---

Comments on "three sons--Simeon (a soldier), TarrasBriukhan (a fat man), and Ivan (a fool)--"

| This expression ... |

[Write in]  [Cancel]   Comments written by user

---

User interface (UI) that appears when user selected text

⋮

Browsing state of electronic document

⇓

Annotation information
- Comments ("This expression ... ")
- Audio information (three/sons/simeon/a/soldier/tarras/briukhan/a/fat/man/and/ivan/a/fool)

FIG. 8

```
<annotation-info index="55" length="35" refid="456" id="789"
chapter="1" section="1" para="2" freqterm="#4" >
   <commentary>This expression ... </commentary>
</annotation-info>
```

```
<annotation-info index="55" length="35" refid="456" id="147"
chapter="1" section="1" para="2" freqterm="#4" >
   <midterm tts="tvs2"> (three/sons/simeon/a/soldier/tarras/
                         briukhan/a/fat/man/and/ivan/a/fool)
                         </midterm>
</annotation-info>
```

F I G. 9

| Metadata ID | Annotation information ID | Annotation information |
|---|---|---|
| 331 | 221 | `<annotation-info index="55" length="35" refid="456" id="840" chapter="1" section="1" para="2" freqterm="#4" >`<br>`<commentary>This expression ...`<br>`</commentary>`<br>`</annotation-info>` |
| ... | ... | ... |

F I G. 10

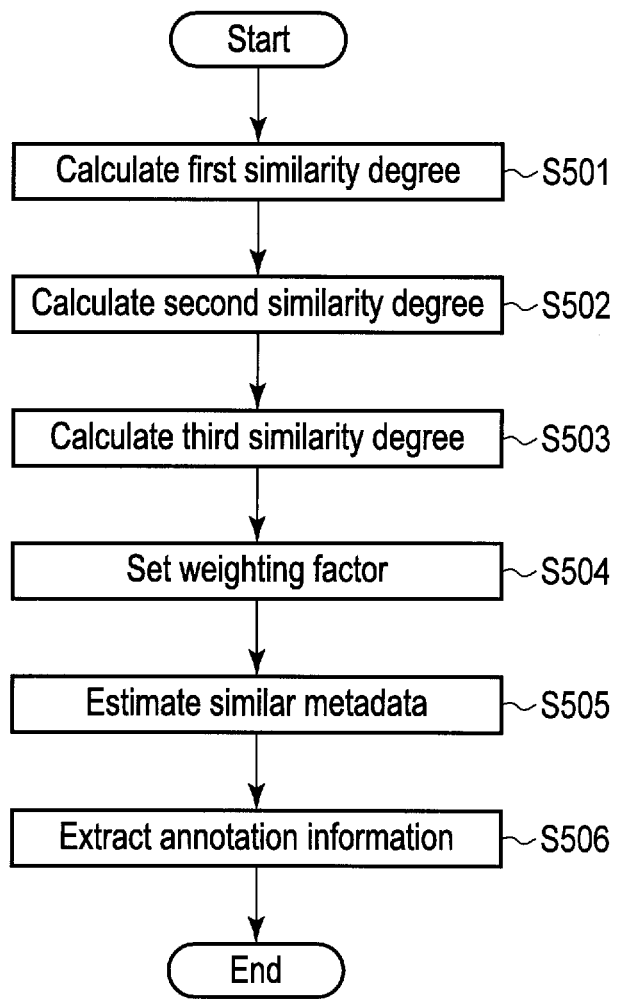
F I G. 11

| Metadata ID | Annotation information ID | Annotation information |
|---|---|---|
| 331 | 221 | \<annotation-info index="55" length="35" refid="456" id="840" chapter="1" section="1" para="2" freqterm="#4" \><br>   \<commentary\>This expression ...<br>\</commentary\><br>\</annotation-info\> |
| 133 | 122 | \<annotation-info index="98" length="35" chapter="1" section="1" para="2" freqterm="#4" refid="654" id="48" \><br>   \<commentary\>This nickname ...<br>\</commentary\><br>\</annotation-info\> |

FIG. 12

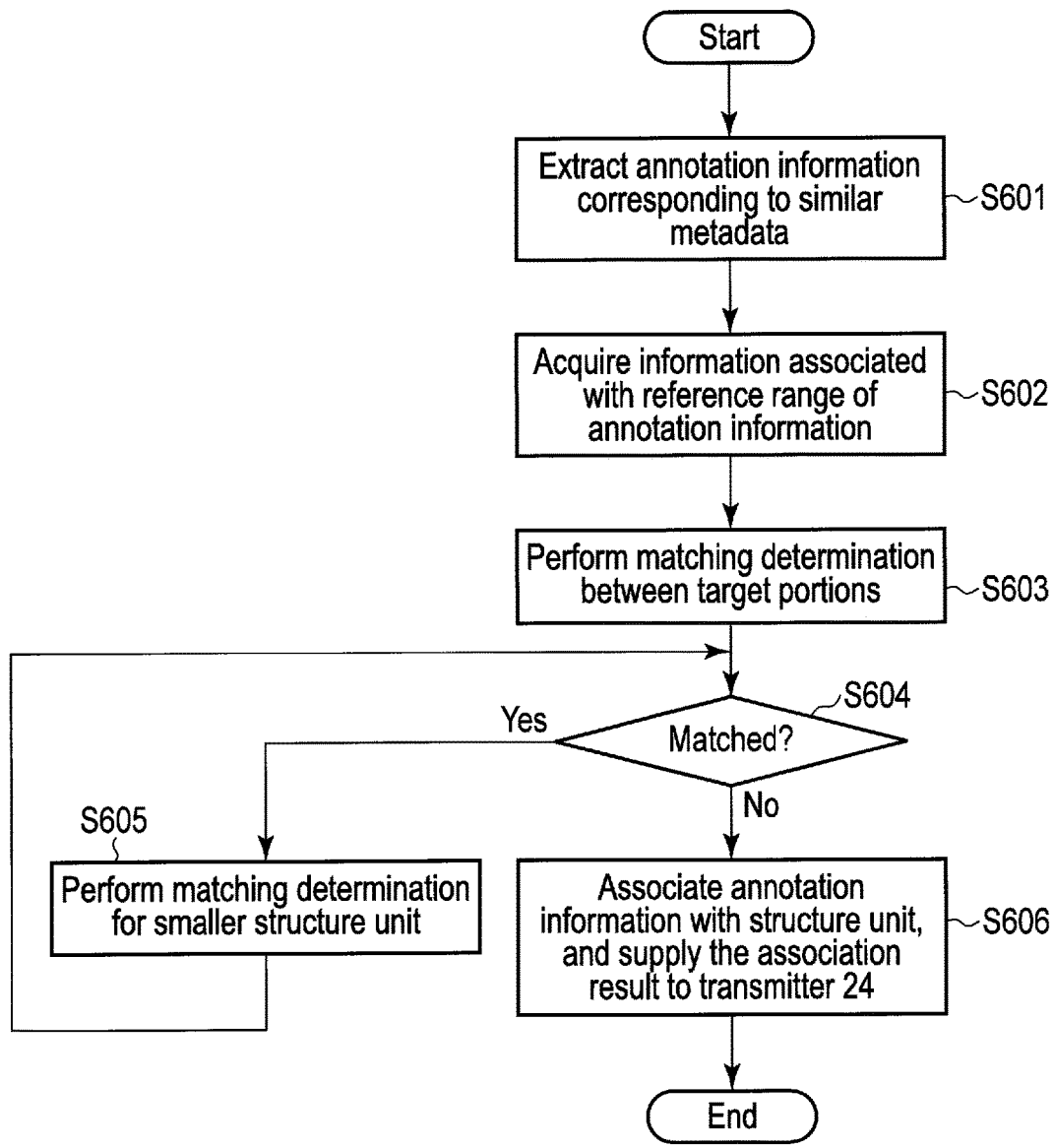
F I G. 13

INFORMATION PROCESSING TERMINAL AND METHOD, AND INFORMATION MANAGEMENT APPARATUS AND METHOD

CROSS-REFERENCE TO RELATED APPLICATIONS

This application is a Continuation application of PCT Application No. PCT/JP2013/057572, filed Mar. 12, 2013 and based upon and claiming the benefit of priority from Japanese Patent Application No. 2012-072517, filed Mar. 27, 2012, the entire contents of all of which are incorporated herein by reference.

FIELD

Embodiments described herein relate to an information processing terminal and method, and an information management apparatus and method.

BACKGROUND

There are information management apparatuses for managing content sites accessible through a network to search for content information, such as moving images or electronic dictionary. These apparatuses include an apparatus in which annotation information added to particular content by a plurality of users is shared between the users.

To enable annotation information for content to be shared between users on a content site, the information management apparatus must store, in a database, the content and the annotation information in association with each other.

However, since the content items are made to correspond to the respective annotation information items, there is a case where a plurality of content items (for example, the same content items of different versions or those published by different publishers) associated with each other exist in the database. In this case, annotation information may not be able to be shared between associated content items. Furthermore, when users independently hold document data out of copyright in different formats or forms in their respective local environments, it is difficult to share annotation information because the databases and file systems are scattered.

Accordingly, in the conventional information management apparatuses, the content information users want to know, and annotation information associated therewith, cannot appropriately be searched for.

BRIEF DESCRIPTION OF THE DRAWINGS

FIG. 1 is a block diagram illustrating information processing terminals 1 and 2 according to a first embodiment;

FIGS. 2A and 2B are flowcharts illustrating processing performed by the information processing terminals 1 and 2;

FIG. 3 is a flowchart illustrating processing performed by a generator 11 incorporated in the information processing terminal 1;

FIG. 4 is a view useful in explaining structure information;

FIG. 5 is a view illustrating an example of metadata;

FIG. 8 is a view useful in explaining annotation information;

FIG. 9 is a flowchart illustrating processing performed by a determination unit 110 employed in a third embodiment;

FIG. 10 is a view illustrating examples of metadata and annotation information stored in a storage 23;

FIG. 11 is a flowchart for acquiring similar metadata;

FIG. 12 is a view illustrating an example of similar metadata;

FIG. 13 is a flowchart illustrating processing performed after extraction of annotation information by an extraction unit 22;

DETAILED DESCRIPTION

Figures 6, 7:
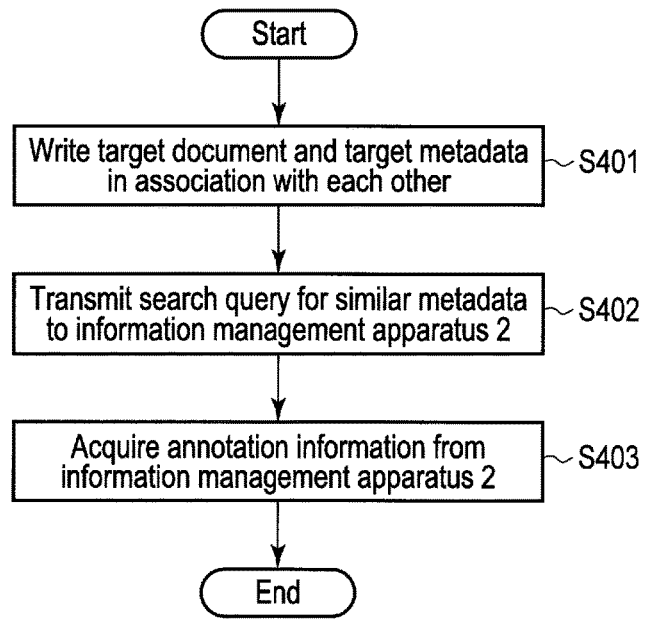
FIG. 6 is a flowchart illustrating processing performed by an acquisition unit 12 incorporated in the information processing terminal 1.
FIG. 7 is a view illustrating an example of corresponding information.

It is an object of the embodiments to provide an information processing terminal and method, and an information management apparatus and method, which enable a user to appropriately search for content information that the user wants to know.

According to one embodiment, an information processing terminal permitted to be connected to an information management apparatus for managing metadata items on electronic documents and annotation information items corresponding to the metadata items, the terminal includes a generator, an acquisition unit, and an output unit. The generator analyzes an electronic document to generate a metadata item including text information in the electronic document and structure information on the electronic document. The acquisition unit transmits the metadata item to the information management apparatus, causes the information management apparatus to estimate a similar metadata item similar to the metadata item and acquires an annotation information item corresponding to the similar metadata item. The output unit outputs the annotation information item in association with the electronic document.

First Embodiment

An information processing terminal 1 according to a first embodiment is suitable as an information terminal (e.g., a PC, a smart phone, a net book, etc.) that can process resources (files or applications) associated with electronic documents. An information management apparatus 2 according to the first embodiment is suitable as a server connectable to the information processing terminal 1. The resources associated with electronic documents are, for example, electronic books.

The information processing terminal 1 analyzes an electronic document (hereinafter, "target document") as a processing target, generates metadata (target metadata) including text data and structure information associated with the target document, and transmits the target metadata to the information management apparatus 2.

The text data includes the text itself in the electronic document, and information obtained by hashing the text. The structure information is associated with the logical structure and/or layout of a document in the electronic document. For instance, the structure information includes indent number, the numbers of text data items, signs, numerals, text sets, and character types, font size, logical elements (such as titles, indexes and body text), layout information, etc., contained in each line of the electronic document. The indent number corresponds to the number of spaces existing between the leading portion of a line and the leading portion of text data in the line. The text set indicates a continuous portion of text data that does not include spaces.

The information management apparatus 2 stores metadata associated with electronic documents, and annotation information associated with the metadata, the metadata and the annotation information being stored in relation to each other. The annotation information is information attached to text data contained in the electronic document. For instance, the annotation information includes comments attached to text data in the electronic document by information processing terminals of unspecified users, or audio information associated with the voice generated by a user when they reads aloud text in the electronic document. The annotation information is not limited to the above, and may be any type of information if it is related to the electronic document.

The information management apparatus 2 searches for similar metadata similar to the target metadata received from the information processing terminal 1, and provides the information processing terminal 1 with annotation information corresponding to the similar metadata.

The information processing terminal 1 outputs the annotation information received from the information management apparatus, in association with the target document. As a result, the user can appropriately search for content information that they want to know.

FIG. 1 is a block diagram illustrating the information processing terminal 1 and the information management apparatus 2. As shown, the information processing terminal 1 comprises a generator 11, an acquisition unit 12, a storage 13 and an output unit 14.

The generator 11 acquires a target document, and generates metadata (target metadata) containing structure information associated with the target document. For example, the generator 11 may acquire, as the target document, an electronic document stored in the information processing terminal 1, or an electronic document downloaded by the user.

The acquisition unit 12 generates a search query for enabling the information management apparatus 2 to estimate similar metadata similar to the target metadata, and transmits the search query to the information management apparatus 2. At this time, the acquisition unit 12 may mark up, in the storage 13, the target document and the target metadata so that they are related to each other. The acquisition unit 12 acquires, from the information management apparatus 2, annotation information corresponding to the similar metadata estimated by the information management apparatus 2.

The output unit 14 outputs the acquired annotation information in association with the target document.

The generator 11 and the acquisition unit 12 may be realized by a central processing unit (CPU) and a memory used by the CPU. The storage 13 may be realized by the memory used by the CPU or an auxiliary storage. The output unit 14 may be realized by a display unit (not shown), such as a liquid crystal display or an organic EL display, or by a voice output unit (not shown), such as a loud speaker.

The information management apparatus 2 comprises a receiver 21, an extraction unit 22, a storage 23 and a transmitter 24.

The receiver 21 receives a search query from the acquisition unit 12 of the information processing terminal 1, and supplies the received search query to the extraction unit 22.

The storage 23 stores metadata on electronic documents and annotation information on the metadata in associated with each other. For instance, the storage 23 may use, as the annotation information, comments on text data in a certain electronic document, added by an unspecified user, and store the annotation information in association with the metadata of the electronic document.

The extraction unit 22 searches the storage 23 based on the supplied search query, thereby estimating similar metadata corresponding to target metadata. The extraction unit 22 extracts, from the storage 23, the annotation information corresponding to the estimated similar metadata, and supplies the extracted annotation information to the transmitter 24.

The transmitter 24 transmits the supplied annotation information to the acquisition unit 12 of the information processing terminal 1.

The receiver 21, the extraction unit 22 and the transmitter 24 may be realized by the CPU and the memory used by the CPU. The storage 23 may be realized by the memory used by the CPU or an auxiliary storing device.

The information processing terminal 1 and the information management apparatus 2 are constructed as the above.

FIGS. 2A and 2B are flowcharts illustrating the processing of the information processing terminal 1 and the information management apparatus 2, respectively.

Referring first to FIG. 2A, the processing by the information processing terminal 1 will be described.

The generator 11 generates a target document and generates target metadata (S101). The acquisition unit 12 generates a search query for enabling the information management apparatus 2 to estimate similar metadata similar to the target metadata (S102). The acquisition unit 12 transmits the generated search query to the information management apparatus 2 (S103). The acquisition unit 12 acquires, from the information management apparatus 2, annotation information corresponding to the similar metadata estimated by the information management apparatus 2 (S104). The output unit 14 outputs the acquired annotation information in association with the target document (S105), which is the termination of this program.

Referring then to FIG. 2B, the processing by the information management apparatus 2 will be described. The processing by the information management apparatus 2 is performed between the steps S103 and S104 of the processing by the information processing terminal 1.

The receiver 21 receives a search query from the acquisition unit 12 of the information processing terminal 1 (S201). In accordance with the search query, the extraction unit 22 searches the storage 23 for similar metadata corresponding to target metadata (S202), and extracts annotation information corresponding to the estimated similar metadata from the storage 23 (S203). The transmitter 24 transmits the annotation information to the acquisition unit 12 of the information processing terminal 1 (S204), which is the termination of this program.

FIG. 3 is a flowchart illustrating the processing by the generator 11 incorporated in the information processing terminal 1. The generator 11 subjects the acquired electronic document to morphological analysis to divide text data in the document into words (S301). The generator 11 detects words of high appearance frequencies in the words obtained by the dividing step (S302). For instance, the generator 11 may acquire words of appearance frequency orders higher than a predetermined order. The generator 11 also stores, as text information, information concerning words of high appearance frequency orders.

The generator 11 analyzes the acquired electronic document to obtain structure information thereon (S303). FIG. 4 is a view useful in explaining structure information. As shown in FIG. 4, the structure information employed in the embodiment is associated with the structure of text data in each line of the electronic document, and includes indent number, the numbers of characters, signs, numerals, and text sets, font size, logical elements, layout information, etc.

A description will be given of the structure information of the first line of an electronic document "SKAZKA O IVANE-DURAKE" shown in FIG. 4. At the first line, if the number of spaces existing between the first portion of the line and the initial character "I" of the text data "Ivan the Fool" is 4, the indent number is 4. The number of characters included in "Ivan the Fool" is 11. The number of symbols included in "Ivan the Fool" is 0. The number of numerals included in "Ivan the Fool" is 0. The number of text sets included in "Ivan the Fool" is 3. The number of character types included in "Ivan the Fool" is 1. The font size of the text data "Ivan the Fool" is 20. The logical element of "Ivan the Fool" is "title."

The layout information indicates the layout of the text data at the line by representing, with "1," the position at which text data exists at least in every-four character grouping, and representing, with "0," the position at which no text data exists in every-four character grouping. Accordingly, the layout information at the first line of the electronic document shown in FIG. 4 can be represented by, for example, "0111100000000000000." Regarding the second and third lines, the layout information can be represented by such structure information as shown in FIG. 4. The same can be said of the other lines.

The generator 11 generates target metadata by structuring text information and structure information (S304). FIG. 5 shows an example of metadata. As shown in FIG. 5, the target metadata of the embodiment includes metadata ID (<metadata id>) for identifying the target metadata, and is obtained by structuring text information and structure information. The metadata ID assigned to the target metadata of FIG. 5 is "123."

For instance, the generator 11 marks up "Tolstoi" as the <creator> element, marks up "Ivan the Fool" as the <title> element, and marks up "xxx" as the <translator> element, as is shown in FIG. 5. At this time, the generator 11 marks up these elements as content corresponding to the identification ID (<description id>) of the target document. The identification ID of the target document shown in FIG. 5 is "456." The generator 11 may include an electronic document URL (uniform resource locator) for the target document, in the content corresponding to the identification ID (<description id>) of the target document. The electronic document URL of the target document shown in FIG. 5 is: "http://www-.toshiba.co.jp/ebook/#1298129sw"

The generator 11 marks up the structure information shown in FIG. 4, obtained at step S303, as the <layout-pattern> element. The generator 11 also marks up the text appearance frequency, obtained at step S302, as the <text-info> element. In the FIG. 5 case, the respective appearance frequencies of "old devil," "straw," "table" and "Ivan" as examples of frequently appearing words or phrases are "35," "20," "10" and "5," respectively. The generator 11 supplies the acquisition unit 12 with the target document and the generated target metadata. The generator 11 also marks up, as structure information, electronic document ID for identifying the target document corresponding to the target metadata, and the URL of the target document. The electronic document ID indicating the target document shown in FIG. 5 is "100."

Although in the above example, the content of text data at each line is written as one line of a text element for facilitating the description, layout information, for example, may be written as hashed information. Further, metadata may include elements that can be extracted as bibliography information, as well as the structure information. For instance, a publisher name, publishing year, month and date, volume number, etc., may be included in metadata, as well as the creator, title and translator shown as examples in FIG. 5.

FIG. 6 is a flowchart illustrating the processing by the acquisition unit 12. The acquisition unit 12 writes, in the storage 13, correspondence information that enables the supplied target document to be associated with target metadata (S401). The acquisition unit 12 generates a search query for enabling the information management apparatus 2 to estimate similar metadata similar to target metadata, and transmits the query to the information management apparatus 2 (S402). The acquisition unit 12 acquires annotation information corresponding to the similar metadata from the information management apparatus 2 (S403). The method of estimating the similar metadata in the information management apparatus 2 will be described later in detail.

A description will now be given of the correspondence information. FIG. 7 shows examples of correspondence information. As shown in FIG. 7, the correspondence information associates, with each other, the metadata ID of the metadata of each electronic document, the electronic document ID of each electronic document, the URL of each electronic document, and the URL of the metadata shown in FIG. 5. It is sufficient if the content itself of the metadata, or the link (path) corresponding to the content of the metadata, is marked up in the metadata column.

The information management apparatus 2 will be described in detail. The storage 23 of the information management apparatus 2 stores metadata and annotation information on each electronic document in association with each other. FIG. 8 is a view useful in explaining the annotation information. The annotation information shown in FIG. 8 is, for example, user comments on text data contained in an electronic document that a user is browsing via their information processing terminal, and designated by the user. Alternatively, the annotation information may be audio information (pronunciation or accent) on the text data.

FIG. 8 shows a case where a certain user has written comments, "This expression is . . . ," on text data, "three sons—Simeon (a soldier), Tarras-Briukhan (a fat man), and Ivan (a fool)—," contained in an electronic document "Ivan the Fool." Further, the audio information on the designated text data, "three sons—Simeon (a soldier), Tarras-Briukhan (a fat man), and Ivan (a fool)—," includes the pronunciation of this sentence, and the positions of accents associated with the sentence. Namely, the annotation information in this example comprises the comments, "This expression is . . . ," and the audio information.

FIG. 9 shows an example of annotation information stored in the storage 23. For instance, the annotation information may be marked up in the XML format. In the shown example, the comments and audio information are marked up as annotation information in the <annotation-info> element.

The storage 23 stores annotation information ID for identifying annotation information, electronic document ID (<refid>) assigned to the electronic document corresponding to the annotation information, index position or length information indicating to which portion of the electronic document the annotation information corresponds, etc.

It is desirable that uniquely definable ID, such as GUID, be beforehand assigned as the electronic document ID. If an electronic document is directly accessible, the portion of the electronic document corresponding to the annotation information can be extracted using the above-mentioned IDs.

The upper portion of FIG. 9 shows a case where the annotation information is user comments. In this case, comments made by a certain user are marked up as the <commentary> element. The lower portion of FIG. 9 shows a case where the annotation information is audio information. The audio information is marked up as the <midterm> element in a text format.

FIG. 10 shows examples of metadata and annotation information stored in the storage 23. The storage 23 stores metadata and annotation information in associated with each other, using metadata ID, annotation information ID, and the annotation information.

The extraction unit 22 of the information management apparatus 2 will be described. When estimating similar metadata corresponding to the target metadata supplied from the receiver 21, the extraction unit 22 calculates a first similarity degree based on text information, a second similarity degree based on structure information, and a third similarity degree based on the text information and the structure information. Based on the first to third similarity degrees, the extraction unit 22 extracts similar metadata from the storage 23.

FIG. 11 is a flowchart illustrating the processing by the extraction unit 22. The extraction unit 22 calculates the first similarity degree (S501). The first similarity degree indicates the degree of similarity associated with the text information. For instance, the extraction unit 22 may calculate the first similarity degree, based on the degree of matching in the n-gram of words or characters of high appearance frequencies between the target metadata and the metadata stored in the storage 23, or based on the degree of matching in pattern between appearing text sequences.

More specifically, the first similarity degree is obtained by, for example, measuring the difference in the appearance frequency of a character or a word between the target metadata and the metadata stored in the storage 23, or calculating the edition distance (Loewenstein distance) between keyword sequences in the former and latter metadata items to thereby calculate the similarity degree between the keyword sequences.

The extraction unit 22 calculates the second similarity degree (S502). The second similarity degree indicates the degree of similarity between tree structures, in the form of which the hierarchy of the logical elements in the structure information is expressed.

More specifically, the second similarity degree can be obtained by, for example, calculating the edition distance between tree structure data items.

When calculating the second similarity degree, the extraction unit 22 may vary the weight for each node corresponding to each logical element, depending upon the type of logical element. For instance, a heavier weight may be assigned to a node corresponding to "Chapter," and a lighter weight be assigned to a node corresponding to "Reference" or "Commentary."

The extraction unit 22 calculates the third similarity degree (S503). The third similarity degree is a degree of similarity in the information as a combination of structure information and text information, such as bibliographical matters that include the title, the creator/translator, and the publishing date of an electronic document. In this example, the bibliographical matters are utilized or published as information indicating the electronic document.

More specifically, assume that in the element <LayoutSim> of target metadata, a character string of "title" included in the target metadata is coded as "path information: /document/root/chapter [@title="chapter 1"]," "text element: let's meet at Kawasaki station."

On the other hand, assume that one of metadata items stored in the storage 23 is coded as "path information: /document/chapter/chapter_title," "text element: let's meet at Kawasaki station."

In this case, the three similarity degree can be obtained by calculating the similarity degree of an edition distance associated with the path information, and that of an edition distance associated with the text element, and summing up the calculated degrees.

In general, even when electronic documents are identical in body text, they are not always identical in structure information. For instance, there are cases where the same title is written in different inscriptions (e.g., in different character styles), where the same text is translated by different translators or in different translation styles, where the same text has different versions, or where the same text is published by different publishers. Thus, for each application, the degree of similarity, with which electronic documents are regarded as the same ones, is determined.

For example, there is a case where annotation information should be extracted for a certain foreign literary work regardless of its translators, or a case where annotation information should not be extracted if the literary work is translated by different translators.

Such a difference as the above can be reflected as a weighting factor at step S504. Thus, the similarity degree based on the above-mentioned viewpoint can be calculated using the weighting factor.

The extraction unit 22 sets weight factors $\alpha$, $\beta$ and $\gamma$ for the first, second and third similarity degrees, respectively, that are used to search for similar metadata corresponding to supplied target metadata (S504). There are various methods for setting the weight factors. A method of selecting factors preset by, for example, a system manager, or a method of dynamically setting factors in accordance with types of electronic documents indicated by target metadata, may be employed. Yet alternatively, weight factors may be set using calculated similarity degrees. The extraction unit 22 also may change the calculation order of similarity degrees. Namely, the extraction unit 22 may, for example, omit a subsequent process in response to a calculated similarity degree associated with an item of a high priority.

Based on the thus-calculated first, second and third similarity degrees, the extraction unit 22 searches the storage 23 for similar metadata. For instance, the extraction unit 22 calculates the similarity degree of metadata based on the first, second and third similarity degrees and the weighting factors $\alpha$, $\beta$ and $\gamma$, using the following equation (1), thereby estimating the metadata as the similar metadata, if the calculated similarity degree of the metadata is not lower than a predetermined threshold:

$$\text{Similarity degree} = \alpha \times \text{first similarity degree} + \beta \times \text{second similarity degree} + \gamma \times \text{third similarity degree} \quad (1)$$

Assume here, for example, that the extraction unit 22 has estimated the similar metadata shown in FIG. 12. More specifically, assume that the metadata shown in FIG. 10 and in the upper portion of FIG. 12, and the metadata corresponding to the annotation information assigned by another user to electronic documents of different electronic document IDs, have been estimated as similar metadata.

At this time, the extraction unit 22 extracts, from the storage 23, annotation information corresponding to the metadata ID of the similar metadata (S506). In this example, the extraction unit 22 extracts the two annotation information items shown in FIG. 12. Regarding the annotation information corresponding to different metadata items, it is necessary to ensure matching between the annotation information and target documents, because different electronic documents are searched for, and hence matching may be lost for details even when it is ensured as a whole. Therefore, it is desirable to detect a shared structure for ensuring matching.

The method of extracting the annotation information will be described in more detail. FIG. 13 is a flowchart illustrating processing performed after extraction of annotation information by an extraction unit 22.

The extraction unit 22 extracts annotation information corresponding to similar metadata (S601), and then acquires information associated with the reference range of the annotation information (S602). This information indicates such various attributes as shown in the annotation information of FIG. 12. Specifically, the attributes include "index" indicating the $n^{th}$ (n is a natural number) character from the beginning of an electronic document associated with text data corresponding to the annotation information, the $n^{th}$ character indicating the start position of the text data, "length" indicating the length of the text data, "chapter" indicating a chapter structure which the text data belongs to, "section" indicating a subchapter structure, "para" indicating a paragraph structure, information indicating the order of text data items with higher appearance frequencies included in the reference range, etc.

Regarding the above information associated with the reference range, the extraction unit 22 performs matching determination concerning a target portion in the target metadata and a target portion in the similar metadata in a decreasing order of structure (S603).

The extraction unit 22 determines whether the target portions match with each other (S604). Since the current annotation information has resulted from matching in similarity between the metadata items, it is assumed that matching is detected on a structure unit basis as a largest unit basis. Further, assume here that a decreasing order, in structure, of "chapter>section>para>freqterm>index" is established, and the extraction unit 22 makes determination of matching in this order.

If it is determined that matching is detected (YES at step S604), determination as to matching is performed for a smaller structure unit (S605), and the processing proceeds to step S603. In contrast, if matching is not detected (NO at step S604), the processing proceeds to step S606. In the example of FIG. 12, it can be understood that a difference will occur when comparison is performed in associated with a structure unit of "index." Accordingly, the extraction unit 22 performs correspondence of annotation information in a structure unit of "freqterm" in which matching is detected with "#4," and sends the annotation information to the transmitter 24 (S606). The transmitter 24 sends the supplied annotation information to the acquisition unit 12 of the information processing terminal 1.

Figure 14A:
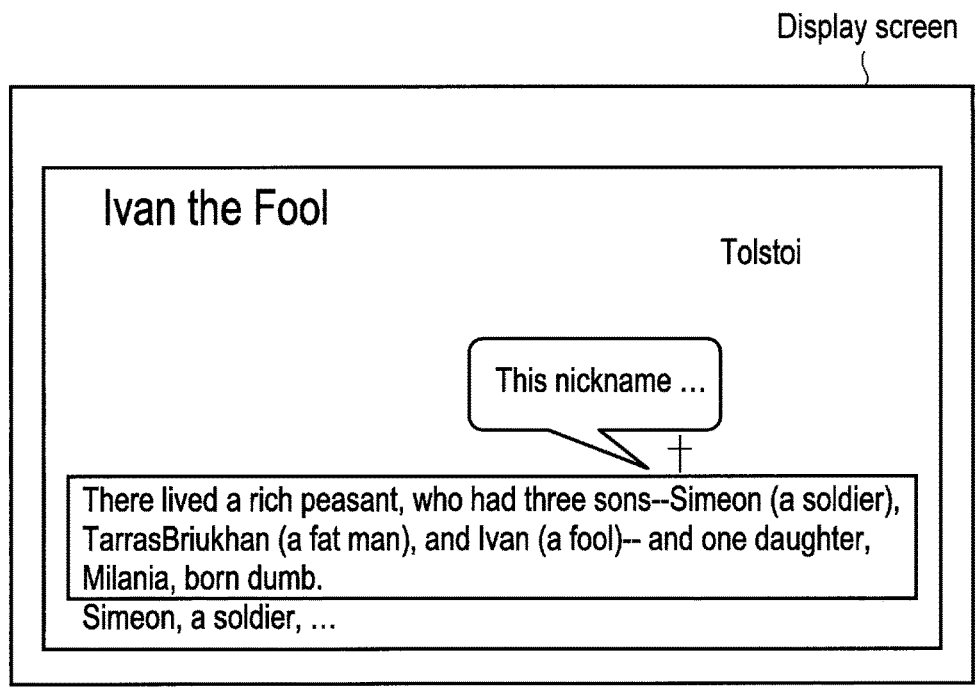
FIGS. 14A and 14B are views illustrating display examples of the annotation information.
Figure 14B:
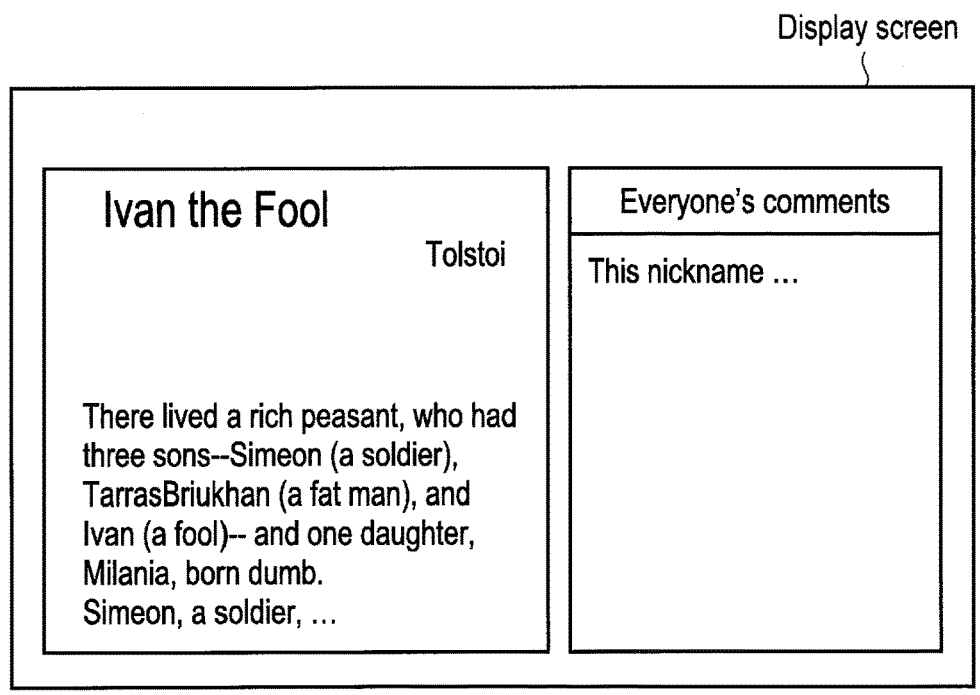

The output unit 14 of the information processing terminal 1 outputs the acquired annotation information in association with the target document. FIGS. 14A and 14B are views illustrating display examples of the annotation information output by the output unit 14 to the display screen of the information processing terminal 1. As shown in FIG. 14A, the output unit 14 may display the annotation information utilizing a popup function that designates a target range, may insert it in a subsequent document, or may display it in another area with a reference sign (e.g., a dagger code) dynamically imparted to it. Further, the output unit 14 may not simultaneously display comments, but may inform the user that there are comments on the target document, by, for example, highlighting a corresponding area, and displaying the comments when the user requests their display. In contrast, if matching is not detected even in a detailed region, annotation information may be displayed in a column form in association with a browsing page, as shown in FIG. 14B. Further, when a target region including a footnote region is displayed, annotation information may be displayed in the footnote region.

In the first embodiment, annotation information items, which were associated with similar content items or were creations derived from similar content items, but were dispersed because they could not be made to correspond to each other, can be made to correspond to each other. This enables not only limited document content prepared by a book seller as a particular service provider, but also similar information on different websites or annotation information associated with the content items computerized by users to be utilized or referred to.

Second Embodiment

An information processing terminal 10 according to a second embodiment differs from the terminal of the first embodiment in that the former can accept input of annotation information by a user of the terminal, and transmit the input annotation information to the information management apparatus 2.

Figure 15:
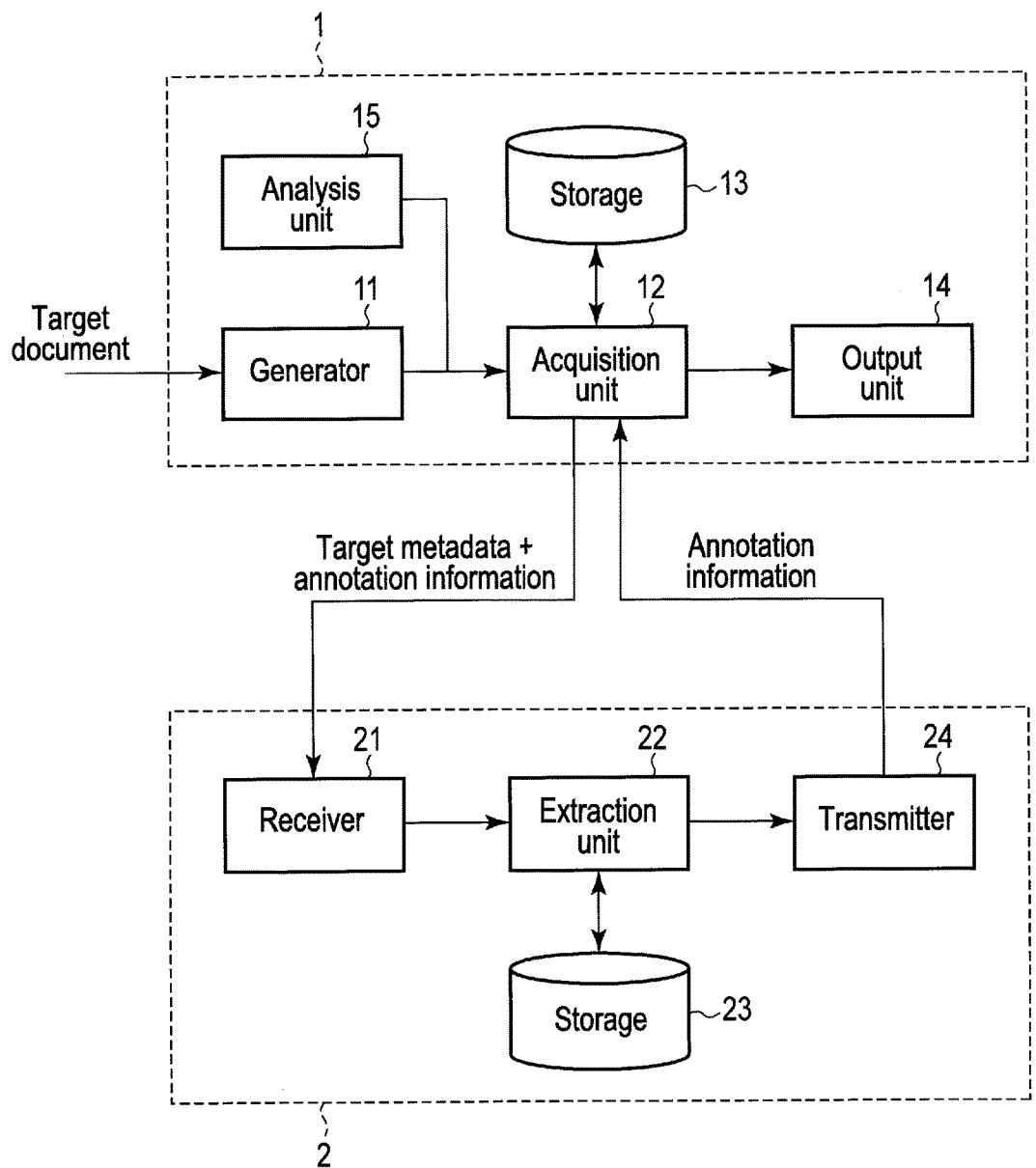
FIG. 15 is a block diagram illustrating an information processing terminal 10 and an information management apparatus 2 according to a second embodiment.

FIG. 15 is a block diagram illustrating the information processing terminal 10 and the information management apparatus 2. The information processing terminal 10 comprises analysis unit 15 in addition to the elements of the information processing terminal 1 of the first embodiment. The analysis unit 15 accepts annotation information, such as comments, on an electronic document input by the user of the terminal. The annotation information according to the second embodiment may be input using, for example, the plug-in function of an electronic book viewer or a UI function on an electronic document browsing service site.

The analysis unit 15 supplies the input annotation information to the acquisition unit 12. The acquisition unit 12 makes the supplied annotation information correspond to target metadata to structure it, and writes it in the storage 12. Further, the acquisition unit 12 transmits, to the receiver 21 of the information management apparatus 2, the annotation information and the target metadata made to correspond to each other. In the information management apparatus 2, the extraction unit 22 stores the annotation information and the target metadata in the storage 23.

The information processing terminal 10 of the second embodiment can acquire, from the information management apparatus 2, annotation information associated with similar metadata corresponding to the target metadata, and also can transmit, to the information management apparatus 2, annotation information input by the user of the terminal 10.

The system of the second embodiment can appropriately search for content information the user wants to acquire.

The information processing terminals and the information management apparatuses of the above-described embodiments can also be realized using, for example, a versatile computer as basic hardware. Namely, the structural elements that should be incorporated in the information processing terminals and the information management apparatuses can be realized by causing a processor in the computer to execute a program. At this time, the information processing terminals and the information management apparatuses may be realized by beforehand installing the program in the computer, or by storing the program in a recording medium, such as a CD-ROM, or by downloading the program through a network to the computer. Yet alternatively, the program can be realized by appropriately utilizing a recording medium, such as a memory, a hard disk, a CD-R, a CD-RW, a DVD-RAM or a DVDR, installed in or externally attached to the computer.

While certain embodiments have been described, these embodiments have been presented by way of example only, and are not intended to limit the scope of the inventions. Indeed, the novel apparatuses, methods and computer readable media described herein may be embodied in a variety of other forms; furthermore, various omissions, substitutions and changes in the form of the apparatuses, methods and computer readable media described herein may be made without departing from the spirit of the inventions. The accompanying claims and their equivalents are intended to cover such forms or modifications as would fall within the scope and spirit of the inventions.

What is claimed is:

1. An information processing terminal permitted to be connected to an information management apparatus for managing metadata items on electronic documents and annotation information items corresponding to the metadata items, the annotation information items on the electronic documents being generated by users, comprising a processing circuitry coupled to a memory, the processing circuitry being configured to:

analyze an electronic document to generate a metadata item including text information in the electronic document and structure information on the electronic document, the structure information being associated with logical structure or layout of a document in the electronic document;

transmit the metadata item to the information management apparatus, to cause the information management apparatus to estimate a similar metadata item similar to the metadata item;

acquire a certain annotation information item corresponding to the similar metadata item, the certain annotation information item being included in the annotation information items, wherein the similar metadata item is estimated based on a first similarity degree, a second similarity degree, and a third similarity degree, wherein the first, second, and third similarity degrees has a weighting factor, wherein the first similarity degree is obtained based on an edition distance between keyword sequences in the metadata item and a stored metadata item;

wherein the second similarity degree indicates a degree of similarity between tree structures, in which a hierarchy of logical elements in the structure information is expressed;

wherein the third similarity degree indicates a degree of similarity in information as a combination of the structure information and the text information; and output the annotation information item in association with the electronic document, the annotation information item being output at least by a voice output device.

2. The terminal according to claim 1, wherein the annotation information item is comment information indicating comments added by the users to the electronic document, or is audio information corresponding to the electronic document.

3. The terminal according to claim 2, wherein the processing circuitry further comprises analyzing the comment information added by the users, and wherein the metadata item transmits, to the information management apparatus, the comment information and the metadata item in association with each other.

4. The terminal according to claim 3, wherein the outputting of the annotation information item modifies an output form of the annotation information item in accordance with a degree of similarity between the metadata item and the similar metadata item, the modified output form comprising both highlighted display and voice.

5. An information management apparatus permitted to receive metadata items on electronic documents from an information processing terminal, comprising a processing circuitry coupled to a memory, the processing circuitry being configured to:

store in a storage the metadata items and annotation information items corresponding to the metadata items, the metadata items including structure information items on the electronic documents and text information items in the electronic documents, the annotation information items on the electronic documents being generated by users, the structure information being associated with logical structure or layout of a document in the electronic document;

acquire a first metadata item as a search target from the information processing terminal;

search the storage for a similar metadata item similar to the first metadata item;

extract a certain annotation information item corresponding to the similar metadata item, the certain annotation information item being included in the annotation information items, wherein the similar metadata item is estimated based on a first similarity degree, a second similarity degree, and a third similarity degree, wherein the first, second, and third similarity degrees has a weighting factor, wherein the first similarity degree is obtained based on an edition distance between keyword sequences in the first metadata item and the stored metadata items;

wherein the second similarity degree indicates a degree of similarity between tree structures in which a hierarchy of logical elements in the structure information is expressed;

wherein the third similarity degree indicates a degree of similarity in information as a combination of the structure information and the text information; and transmit the extracted annotation information item to the information processing terminal, the annotation information item being output at least by a voice output device.

6. The apparatus according to claim 5, wherein the searching the storage extracts a second metadata item as the similar metadata item, if text information and structure information included in the second metadata item are similar to the text information and the structure information included in the first metadata item.

7. An information processing method for controlling an information processing terminal permitted to be connected to an information management apparatus for managing metadata items on electronic documents and annotation information items corresponding to the metadata items, the annotation information items on the electronic documents being generated by users, comprising:
  analyzing an electronic document to generate a metadata item including text information in the electronic document and structure information on the electronic document, the structure information being associated with logical structure or layout of a document in the electronic document;
  transmitting the metadata item to the information management apparatus;
  causing the information management apparatus to estimate a similar metadata item similar to the metadata item, wherein the similar metadata item is estimated based on a first similarity degree, a second similarity degree, and a third similarity degree, wherein the first, second, and third similarity degrees has a weighting factor,
  wherein the first similarity degree is obtained based on an edition distance between keyword sequences in the metadata item and a stored metadata item;
  wherein the second similarity degree indicates a degree of similarity between tree structures, in which a hierarchy of logical elements in the structure information is expressed;
  wherein the third similarity degree indicates a degree of similarity in information as a combination of the structure information and the text information;
  acquiring a certain annotation information item corresponding to the similar metadata item, the certain annotation information item being included in the annotation information items; and
  outputting the annotation information item in association with the electronic document, the annotation information item being output at least by a voice output device.

8. The method according to claim 7, wherein the annotation information item is comment information indicating comments added by the users to the electronic document, or is audio information corresponding to the electronic document.

9. The method according to claim 8, further comprising analyzing the comment information added by the users, and wherein the transmitting the metadata item transmits, to the information management apparatus, the comment information and the metadata item in association with each other.

10. The method according to claim 9, wherein the outputting the annotation information item modifies an output form of the annotation information item in accordance with a degree of similarity between the metadata item and the similar metadata item, the modified output form comprising both highlighted display and voice.

11. An information processing method for use in an information management apparatus permitted to receive metadata items on electronic documents from an information processing terminal, comprising:
  acquiring a metadata item as a search target from the information processing terminal;
  searching a storage which stores the metadata items and annotation information items corresponding to the metadata items, the metadata items including structure information items on the electronic documents and text information items in the electronic documents, the annotation information items on the electronic documents being generated by users, to detect a similar metadata item similar to the acquired metadata item, wherein the similar metadata item is estimated based on a first similarity degree, a second similarity degree, and a third similarity degree, wherein the first, second, and third similarity degrees has a weighting factor,
  wherein the first similarity degree is obtained based on an edition distance between keyword sequences in the metadata item and a stored metadata item;
  wherein the second similarity degree indicates a degree of similarity between tree structures in which a hierarchy of logical elements in the structure information is expressed;
  wherein the third similarity degree indicates a degree of similarity in information as a combination of the structure information and the text information;
  extracting a certain annotation information item corresponding to the similar metadata item, the certain annotation information item being included in the annotation information items, the structure information being associated with logical structure or layout of a document in the electronic documents; and
  transmitting the extracted annotation information items to the information processing terminal, the annotation information item being output at least by a voice output device.

12. The method according to claim 11, wherein the searching the storage extracts a second metadata item as the similar metadata item, if text information and structure information included in the second metadata item are similar to the text information and the structure information included in the first metadata item.

13. The apparatus according to claim 5, wherein the certain annotation information item is comment information indicating comments added by the users to the electronic document, or is audio information corresponding to the electronic document.

14. The terminal according to claim 1, wherein the metadata items include indent number, the numbers of characters, signs, numerals, and text sets, font size, logical elements, layout information.

* * * * *